(12) United States Patent
Inoue et al.

(10) Patent No.: US 8,366,587 B2
(45) Date of Patent: Feb. 5, 2013

(54) CONTROL DEVICE OF VEHICLE DRIVE-TRAIN SYSTEM

(75) Inventors: Junichi Inoue, Toyota (JP); Hitoshi Matsunaga, Anjo (JP); Yoshio Hasegawa, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 184 days.

(21) Appl. No.: 13/036,561

(22) Filed: Feb. 28, 2011

(65) Prior Publication Data

US 2011/0230308 A1    Sep. 22, 2011

(30) Foreign Application Priority Data

Mar. 19, 2010   (JP) ................................. 2010-063736

(51) Int. Cl.
*B60W 10/04* (2006.01)
*B60W 10/10* (2006.01)
*B60W 10/02* (2006.01)
*F16H 61/00* (2006.01)
*F16H 61/14* (2006.01)
*F16H 45/02* (2006.01)

(52) U.S. Cl. ........ 477/110; 477/107; 477/109; 477/168; 477/169; 477/174; 477/175; 477/180

(58) Field of Classification Search ................ 477/107, 477/109, 110, 168, 169, 174, 175, 180
See application file for complete search history.

(56) References Cited

U.S. PATENT DOCUMENTS

| 5,393,279 A | * | 2/1995 | Bota et al. ...................... 477/143 |
| 2008/0146412 A1 | * | 6/2008 | Sagawa et al. ................ 477/108 |

FOREIGN PATENT DOCUMENTS

| JP | 2001-304003 | | 10/2001 |
| JP | 2006-153225 | | 6/2006 |
| JP | 2008-106841 | | 5/2008 |
| JP | 2010180787 A | * | 8/2010 |
| JP | 2010255823 A | * | 11/2010 |
| JP | 2011007070 A | * | 1/2011 |

* cited by examiner

*Primary Examiner* — Tisha Lewis
(74) *Attorney, Agent, or Firm* — Oblon, Spivak, McClelland, Maier & Neustadt, L.L.P.

(57) ABSTRACT

A control device of a vehicle drive-train system including an engine, an electronic throttle valve, an automatic transmission having a manual shift mode, a torque converter provided between the automatic transmission and the engine, and a lock-up clutch operable to directly connect an input member and an output member of the torque converter with each other includes a blipping control device that performs blipping control for temporarily increasing the output rotational speed of the engine by of the electronic throttle valve, when a power-off downshift is performed while the automatic transmission is in the manual shift mode; and a lock-up control device that engages or partially engages the lock-up clutch, based on a difference between a rotational speed of the output member of the torque converter and a rotational speed of the input member thereof, which the difference is reduced after the blipping control is started.

5 Claims, 8 Drawing Sheets

FIG.3

|  | C1 | C2 | B1 | B2 | B3 |
|---|---|---|---|---|---|
| 1st | ○ |  |  | ○ |  |
| 2nd | ○ |  | ○ |  |  |
| 3rd | ○ |  |  |  | ○ |
| 4th | ○ | ○ |  |  |  |
| 5th |  | ○ |  |  | ○ |
| 6th |  | ○ | ○ |  |  |
| Rev |  |  |  | ○ | ○ |
| N |  |  |  |  |  |

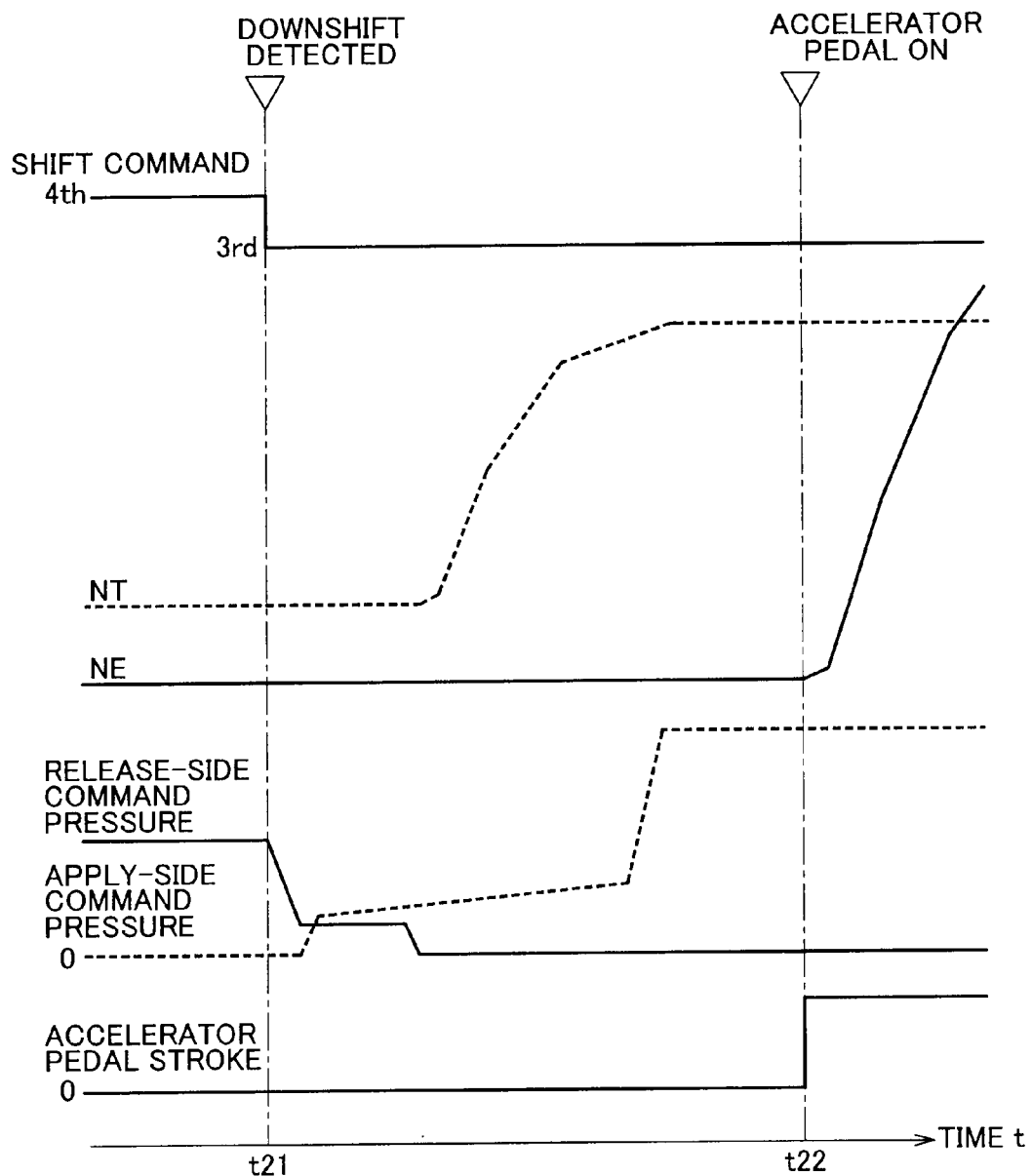

CONTROL DEVICE OF VEHICLE DRIVE-TRAIN SYSTEM

INCORPORATION BY REFERENCE

The disclosure of Japanese Patent Application No. 2010-063736 filed on Mar. 19, 2010 including the specification, drawings and abstract is incorporated herein by reference in its entirety.

BACKGROUND OF THE INVENTION

1. Field of the Invention

The invention relates to a control device of a vehicle drive-train system including a lock-up clutch, and is particularly concerned with control associated with engagement of the lock-up clutch.

2. Description of the Related Art

A vehicle drive-train system is known which includes an engine, an electronic throttle valve operable to change the output rotational speed of the engine based on an electric command, without depending on an operation on an accelerator pedal, an automatic transmission having a manual shift mode in which shifting is effected based on a shift operation performed on a manually operated member, a torque converter provided between the automatic transmission and the engine, and a lock-up clutch operable to directly connect an input member and an output member of the torque converter with each other. Examples of the vehicle drive-train system of this type are described in Japanese Patent Application Publication No. 2006-153225 (JP-A-2006-153225), Japanese Patent Application Publication No. 2008-106841 (JP-A-2008-106841), and Japanese Patent Application Publication No. 2001-304003 (JP-A-2001-304003).

In the vehicle drive-train system as described above, during coasting, if lock-up control for engaging the lock-up clutch or lock-up slip control for partially engaging the lock-up clutch is finished because a tip-in operation of the accelerator pedal is performed or it is determined to prevent deterioration of a catalyst in an engine exhaust pipe, for example, the lock-up control or lock-up slip control will not be executed until subsequent depression of the accelerator pedal makes the input rotational speed of the torque converter close to the output rotational speed thereof. In the case where the input rotational speed of the torque converter (i.e., the engine speed) becomes lower than the output rotational speed thereof upon termination of the lock-up clutch (or lock-up slip control), if the lock-up clutch is executed under a condition where there is a large difference between the input rotational speed and the output rotational speed, it may be difficult to raise the input rotational speed due to an insufficient torque capacity of the lock-up clutch, or large shock may occur due to the rise or increase of the input rotational speed, or the amount of heat generated in the lock-up clutch may exceed an allowable value.

Accordingly, if the lock-up control (or lock-up slip control) is not executed irrespective of the driver's request for engine braking, as represented by the amount of operation of the accelerator pedal being equal to or close to zero, the engine is not brought into a driven state, and a sufficient engine brake, or a sufficient deceleration, cannot be obtained. Thus, even in the case where the driver performs a manual operation to effect a downshift in an attempt to provide a sufficient deceleration, the lock-up control is not executed since the situation where there is a large difference between the input rotational speed and output rotational speed of the torque converter does not change, as a result, a sufficient deceleration cannot be achieved. Also, if the lock-up control is not performed, it takes time to establish a condition in which the driving wheels are driven by the engine when the vehicle is accelerated again, namely, a condition in which the input rotational speed of the torque converter becomes higher than the output rotational speed thereof, resulting in a poor response.

According to a technology disclosed in JP-A-2008-106841, when a downshift is executed during coasting, the engine speed is temporarily raised or increased in a condition where the automatic transmission is placed in a neutral condition, and a clutch for shifting is engaged at the time when the output rotational speed becomes equal to a given synchronous rotational speed. Then, a given standby pressure is supplied to a hydraulic actuator of the lock-up clutch during the shift operation, and the lock-up clutch is engaged after completion of the shift operation. In this type of vehicle drive-train system, however, the engine speed that has been raised during the shift operation may be reduced at the time of completion of the shift operation; therefore, the difference between the input rotational speed and output rotational speed of the torque converter may be increased, and the lock-up control is not always performed with sufficient stability.

According to a technology disclosed in JP-A-2001-304003, when a difference between the input rotational speed and output rotational speed of the torque converter exceeds a specified range, the engine speed is increased so as to surely engage the lock-up clutch. In this type of vehicle drive-train system, however, the operation to increase the engine speed is performed after an operation to engage the lock-up clutch is started, though the operation to engage the lock-up clutch is not necessarily executed according to the difference between the input rotational speed and output rotational speed of the torque converter; therefore, the difference between the input rotational speed and output rotational speed of the torque converter may remain large due to time lag of the engine power output or the like when the lock-up clutch is engaged, and the lock-up control is not always performed with sufficient stability.

SUMMARY OF THE INVENTION

The invention provides a control device of a vehicle drive-train system, which is able to quickly provide a deceleration of the vehicle upon a downshift during coating.

The invention is concerned with a control device of a vehicle drive-train system including an engine, an electronic throttle valve operable to change an output rotational speed of the engine based on an electric command, without depending on an operation on an accelerator pedal, an automatic transmission having a manual shift mode in which shifting is effected based on a shift operation performed on a manually operated member, a torque converter provided between the automatic transmission and the engine, and a lock-up clutch operable to directly connect an input member and an output member of the torque converter with each other. The control device includes a blipping control device that performs blipping control for temporarily increasing the output rotational speed of the engine by means of the electronic throttle valve, when a power-off downshift is performed while the automatic transmission is in the manual shift mode, and a lock-up control device that engages or partially engages the lock-up clutch, based on a difference between a rotational speed of the output member of the torque converter and a rotational speed of the input member thereof, which the difference is reduced after the blipping control is started.

The control device includes the blipping control device that temporarily increases the output rotational speed of the engine by means of the electronic throttle valve, when a power-off downshift is performed while the automatic transmission is in the manual shift mode, and the lock-up control device that engages or partially engages the lock-up clutch, based on a difference between the rotational speed of the output member of the torque converter and the rotational speed of the input member thereof, which difference is reduced after the blipping control device starts the blipping control. In the case where a downshift is requested during coasting when the rotational speed of the input member of the torque converter is lower than the output rotational speed thereof with no lock-up control being performed, the lock-up control or lock-up slip control is executed after the difference between the rotational speed of the output member of the torque converter and the rotational speed of the input member thereof is reduced to such an extent that the lock-up control or lock-up slip control can be stably performed, so that the engine is brought into a driven state, thus providing a sufficient engine brake. As a result, a desired deceleration of the vehicle can be quickly achieved in response to the downshift during coasting. For example, an engine brake is more quickly applied, as compared with the case where lock-up control or lock-up slip control is performed with the amount of depression of the accelerator pedal made equal to or close to zero, after the engine speed is increased with the accelerator pedal depressed after completion of a downshift.

In the control device as described above, the lock-up control device may engage or partially engage the lock-up clutch, when the difference between the rotational speed of the output member of the torque converter and the rotational speed of the input member thereof is smaller than a predetermined value.

According to the control device as described above, the lock-up control device engages or partially engages the lock-up clutch when the difference between the rotational speed of the output member of the torque converter and the rotational speed of the input member thereof is smaller than the predetermined value. Thus, if the lock-up control or lock-up slip control is executed when the difference between the rotational speed of the output member of the torque converter and the rotational speed of the input member thereof is reduced to be smaller than the above-indicated predetermined value, which is determined as a value that permits the lock-up control or lock-up slip control to be stably performed, the lock-up control or lock-up slip control can be stably performed. If the lock-up control or lock-up slip control is executed while the difference is large, on the other hand, there may arise that 1) it is difficult to raise the rotational speed of the input member due to an insufficient torque capacity of the lock-up clutch, 2) large shock occurs due to the rise or increase of the rotational speed of the input member, and 3) the amount of heat generated in the lock-up clutch exceeds an allowable value.

In the control device as described above, the lock-up control device may fill a hydraulic actuator of the lock-up clutch with a hydraulic oil having a predetermined standby pressure that does not cause the lock-up clutch to be engaged, during blipping control of the blipping control device.

According to the control device as described above, the lock-up control device fills the hydraulic actuator of the lock-up clutch with the hydraulic oil of the predetermined standby pressure that does not cause the lock-up clutch to be engaged, during blipping control of the blipping control device. Therefore, the lock-up clutch can be engaged or partially engaged immediately after the start of the lock-up control or lock-up slip control, and a desired deceleration of the vehicle can be more quickly achieved.

In the control device as described above, the lock-up control device may engage or partially engage the lock-up clutch during the power-off downshift.

According to the control device as described above, the lock-up control device engages or partially engages the lock-up clutch during the power-off downshift; therefore, a desired deceleration of the vehicle can be more quickly achieved, as compared with the case where the lock-up clutch is engaged or partially engaged after a downshift, for example. Also, shock that occurs upon engagement of the lock-up clutch can be advantageously absorbed or eliminated by shift shock that occurs during the downshift.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein:

FIG. 3 is an engagement operation table indicating the relationships between a plurality of speeds selectively established by the automatic transmission of FIG. 2, and the operating states of a plurality of hydraulic friction devices;

FIG. 10 is a time chart useful for explaining control operations performed by an electronic control unit of the related art, which includes no blipping control device and no lock-up control device.

DETAILED DESCRIPTION OF EMBODIMENTS

Figure 1:
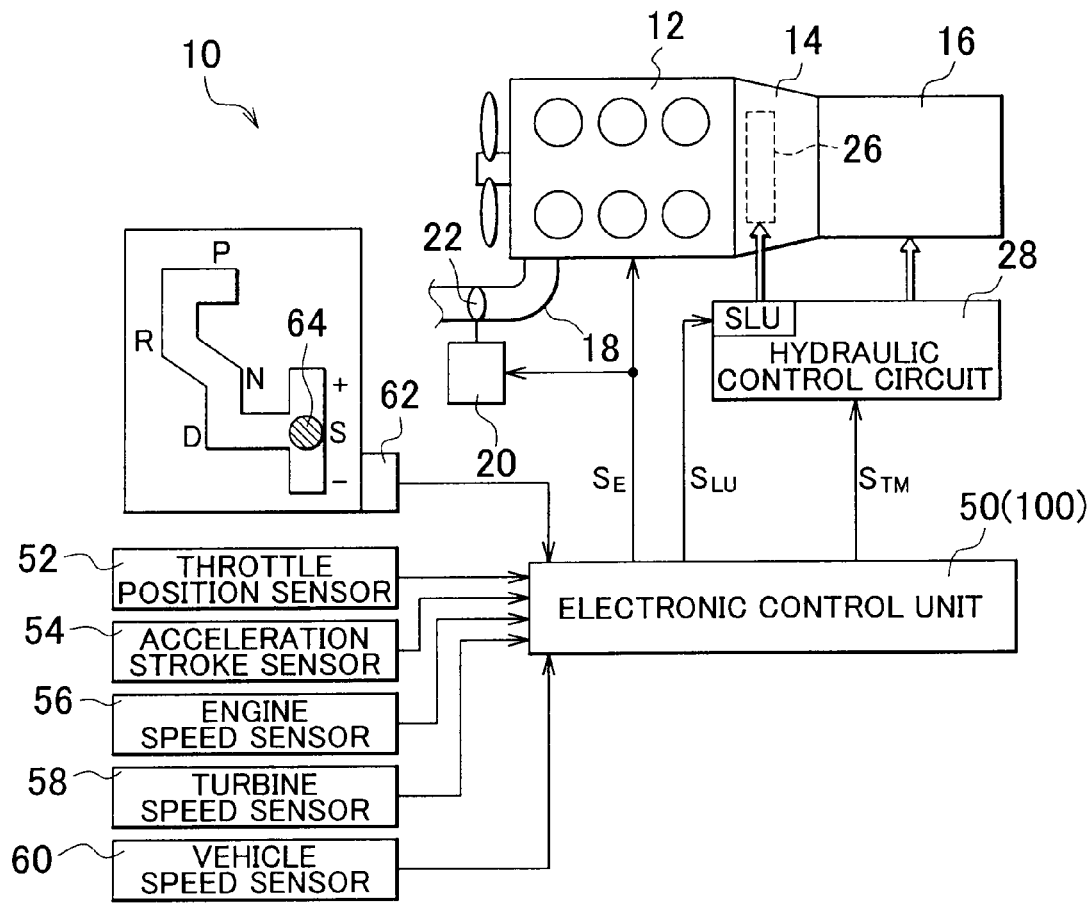
FIG. 1 is a view useful for explaining a vehicle drive-train system and its control system according to one embodiment of the invention.

One embodiment of the invention will be described in detail with reference to the drawings. In the drawings, the construction or arrangement of the embodiment is simplified or modified as needed, and the dimensional ratios and shapes of its components, elements or portions are not necessarily depicted correctly.

First Embodiment

FIG. 1 illustrates a vehicle drive-train system 10 and its control system to which the invention is applied. The vehicle drive-train system 10 shown in FIG. 1 includes an engine 12 as a driving power source for running the vehicle, a torque converter 14, and an automatic transmission 16, which are arranged in series. In operation, power generated from the engine 12 is transmitted to a pair of driving wheels, via the torque converter 14, automatic transmission 16, a differential gear unit that provides another part of the drive train and the like, in this order.

The engine 12 is an internal combustion engine, such as a gasoline engine or a diesel engine, which produces driving force through combustion of fuel injected into cylinders, for example. An electronic throttle valve 22 provided in an intake pipe 18 of the engine 12 is operated, i.e., opened and closed by a throttle actuator 20 that operates based on an electric signal (electric command) from an electronic control unit 50 that will be described in detail, so as to adjust the amount of intake air drawn into the engine 12 and change the output rotational speed of the engine 12, or the engine speed $N_E$. The engine power output increases as the opening of the electronic throttle valve 22, or the throttle opening $\theta_{TH}$, increases. Basically, as the accelerator pedal stroke $\theta_{ACC}$ as the amount of operation of an accelerator pedal increases, the throttle opening $\theta_{TH}$ is increased according to a predetermined relationship. In exceptional cases, the throttle opening $\theta_{TH}$ may be changed based on an electric signal generated from the electronic control unit 50, without depending on any operation on the accelerator pedal.

Figure 2:
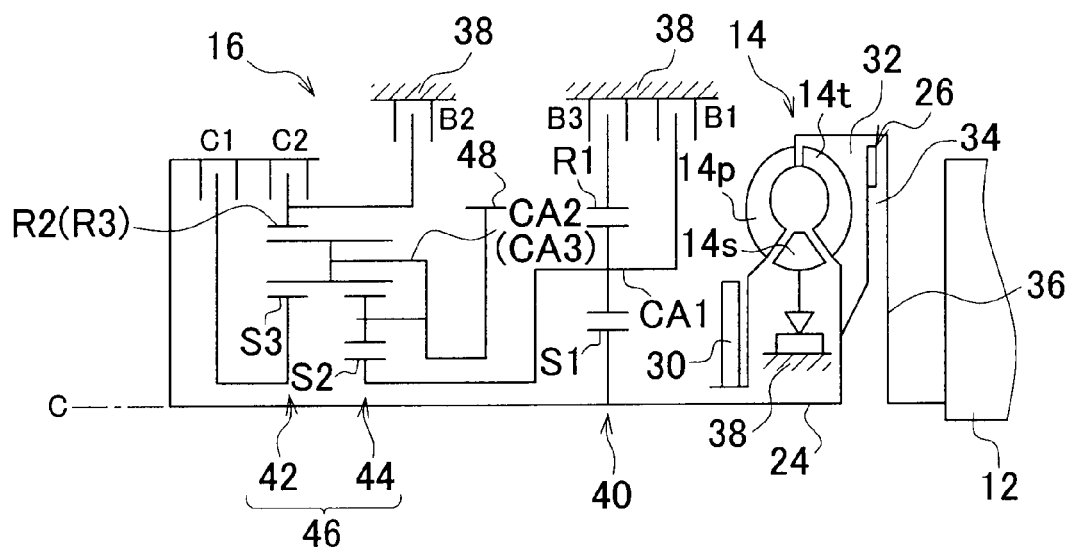
FIG. 2 is a skeleton diagram useful for explaining the construction of a torque converter and an automatic transmission shown in FIG. 1.

The torque converter 14 is a hydraulic power transmitting device that transmits power via a fluid. The automatic transmission 16 is a multiple-speed transmission having a predetermined number of gear ratios or speeds (six speeds in this embodiment) of which a selected one is established. FIG. 2 is a skeleton diagram illustrating the construction of the torque converter 14 and automatic transmission 16. The torque converter 14 and the automatic transmission 16 are constructed substantially symmetrically with respect to axis C, and the lower halves of the torque converter 14 and automatic transmission 16 below the axis C are not illustrated in FIG. 2.

In FIG. 2, the torque converter 14 is disposed between the engine 12 and the automatic transmission 16. The torque converter 14 includes a pump impeller (input member) 14p coupled to a crankshaft of the engine 12, a turbine wheel (output member) 14t coupled to the automatic transmission 16 via a turbine shaft 24, and a stator wheel 14s that is inhibited from rotating in one direction by a one-way clutch. In the torque converter 14, power is transmitted via fluid between the pump impeller 14p and the turbine wheel 14t. A lock-up clutch 26 is provided between the pump impeller 14p and the turbine wheel 14t, for directly connecting the pump impeller 14p and the turbine wheel 14t, i.e., the input and output members of the torque converter 14, with each other. A mechanical oil pump 30 is coupled to the pump impeller 14p. In operation, the oil pump 30 is rotated or driven by the pump impeller 14p so as to generate a hydraulic pressure that provides an original pressure for controlling shifting of the automatic transmission 16, controlling the operation of the lock-up clutch 26, or supplying lubricating oil to each part of the drive train, and supply the hydraulic pressure to a hydraulic control circuit 28 shown in FIG. 1.

The lock-up clutch 26 is a hydraulic friction clutch that is engaged by friction with a front cover 36 by means of the hydraulic control circuit 28 that controls a pressure difference between a hydraulic pressure in an apply-side oil chamber 32 and a hydraulic pressure in a release-side oil chamber 34. The operating state of the torque converter 14 falls roughly into three operating states, namely, a so-called lock-up release state (non-engaged state) in which the pressure difference is made negative and the lock-up clutch 26 is released, a so-called lock-up slip state (half-engaged or partially engaged state) in which the pressure difference is made equal to or larger than zero and the lock-up clutch 26 is partially engaged while slipping, and a so-called lock-up state (engaged state) in which the pressure difference is made equal to the maximum value and the lock-up clutch 26 is fully engaged. For example, when the lock-up clutch 26 is fully engaged, the pump impeller 14p and the turbine wheel 14t rotate as a unit, and the power of the engine 12 is directly transmitted to the automatic transmission 16. When the pressure difference is controlled so that the lock-up clutch 26 is engaged in a certain slipping condition, such that the slip amount $N_S$ (an absolute value of a difference between the engine speed $N_E$ and the turbine speed $N_T$) is controlled in a feedback manner, the turbine shaft 24 is rotated following rotation of the crankshaft with a given slip amount $N_S$ during power-on running of the vehicle, whereas the crankshaft is rotated following rotation of the turbine shaft 24 with a given slip amount $N_S$ during power-off running of the vehicle. A target value of the slip amount $N_S$, or a target slip amount $N_S$, is set in advance to, for example, about 50 to 100 rpm.

Preferably, the automatic transmission 16 of this embodiment is laterally installed and used in a FF (front-engine, front-drive) vehicle. The automatic transmission 16 is housed in a transmission case 38 as a non-rotating member mounted on the vehicle body, and includes a single-pinion type first planetary gear set 40, and a Ravigneaux type planetary gear set 46 comprised of a double-pinion type secondary planetary gear set 42 and a single-pinion type third planetary gear set 44, which are arranged on the common axis C. The automatic transmission 16 changes the speed of rotation of the turbine shaft 24 via the above-mentioned planetary gear sets, and delivers the resulting rotary power from an output gear 48. The turbine shaft 24 corresponds to an input member of the automatic transmission 16. The output gear 48 corresponds to an output member of the automatic transmission 16, and functions as a differential drive gear that meshes with a differential driven gear of the differential gear unit (not shown) provided on the output side of the automatic transmission 16 (i.e., downstream of the automatic transmission 16) so as to transmit power to the differential gear unit.

Figure 3:
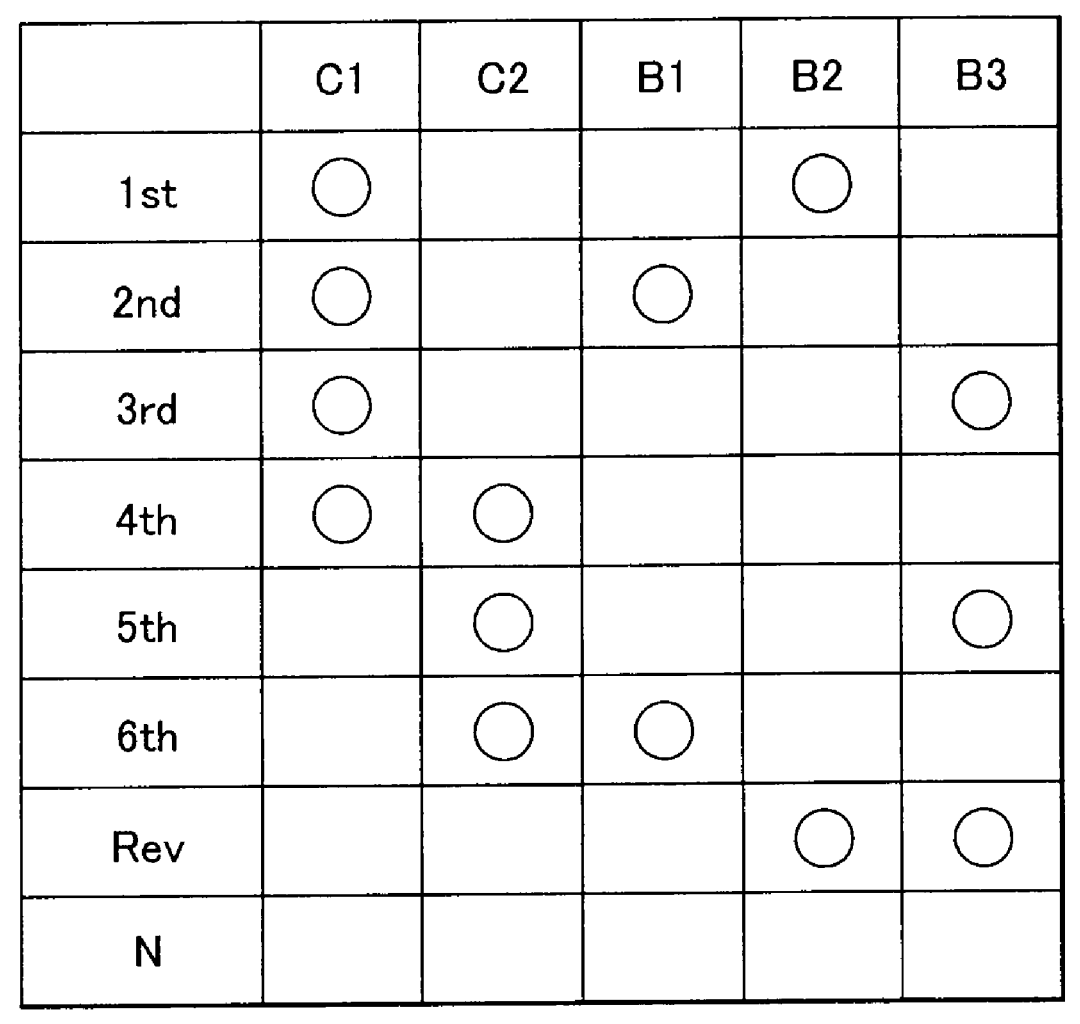

The automatic transmission 16 includes clutches C1, C2 and brakes B1, B2, B3 as shown in FIG. 2, as hydraulic friction devices that are selectively operated so as to establish a selected one of six forward speeds or gear ratios from the first speed "1st" to the sixth speed "6th" and one reverse speed or gear ratio "Rev", in accordance with engaging conditions between corresponding ones of its rotating elements (sun gears S2 and S3, carriers CA1, CA2 and CA3 and ring gears R1, R2 and R3), and engaging conditions between the respective rotating elements and the transmission case 38. The above-mentioned clutches and brakes are hydraulic friction devices, such as multiple-disc type clutches and brakes, which are engaged or disengaged under control by hydraulic actuators. Through control of the energized state of a solenoid valve or valves included in the hydraulic control circuit 28 shown in FIG. 1, a selected one or ones of the friction devices is/are switched to an engaged or released state, while transient hydraulic pressures during engagement and release of the friction devices are suitably controlled. FIG. 3 is an engagement operation table indicating the relationships between the above-indicated plurality of speeds selectively established by the automatic transmission 16, and the operating states of the clutches and brakes.

Referring back to FIG. 1, the vehicle drive-train system 10 includes the electronic control unit 50 that performs various controls, such as output control of the engine 12, shift control of the automatic transmission 16, and engagement control of the lock-up clutch 26. The electronic control unit 50 corresponds to the control device of the vehicle drive-train system according to the invention. The electronic control unit 50 includes a so-called microcomputer having CPU, RAM, ROM, input/output interface, etc., and is configured to carry out various controls as described above when the CPU performs signal processing according to programs stored in advance in the ROM, while utilizing the temporary storage function of the RAM.

As shown in FIG. 1, the electronic control unit 50 receives signals indicative of conditions of the vehicle, from various sensors provided in respective parts of the vehicle. For example, the electronic control unit 50 is supplied with a signal indicative of the throttle opening $\theta_{TH}$ of the electronic throttle valve 22 detected by a throttle position sensor 52, a signal indicative of the accelerator pedal stroke $\theta_{ACC}$ as the amount of operation of the accelerator pedal (not shown) detected by an acceleration stroke sensor 54, a signal indicative of the engine speed $N_E$ of the engine 12 detected by an engine speed sensor 56, a signal indicative of the turbine speed $N_T$ of the turbine wheel 14*t* detected by a turbine speed sensor 58, a signal indicative of the vehicle speed V detected by a vehicle speed sensor 60, a signal indicative of the currently selected operating position $P_{SH}$ of a shift lever 64 detected by a lever position sensor 62, and so forth.

Also, signals used for controlling the operations of various devices provided in the vehicle are generated from the electronic control unit 50. For example, the electronic control unit 50 generates a throttle signal for driving the throttle actuator 20 for controlling the opening/closing of the electronic throttle valve 22, an ignition signal for controlling the amount of fuel injected from a fuel injection device (not shown), an ignition timing signal for controlling the ignition timing of an ignition device (no shown) in the engine 12, etc., as engine output control command signals $S_E$ for use in output control of the engine 12. Also, the electronic control unit 50 generates signals for driving various solenoid valves (not shown) provided for the respective clutches and brakes in the hydraulic control circuit 28, etc., as shift control command signals $S_{TM}$ for use in shift control of the automatic transmission 16. Also, the electronic control unit 50 generates a signal for driving a linear solenoid valve SLU for lock-up control provided in the hydraulic control circuit 28, etc., as a lock-up clutch engagement control signal $S_{LU}$ for use in engagement control of the lock-up clutch 26.

The shift lever 64 is mounted in the vicinity of the driver's seat, for example, and is adapted to be manually operated to a selected one of five operating positions "P", "R", "N", "D" and "S", as shown in FIG. 1. The operating position "P" is a parking position in which rotation of the output gear 48 of the automatic transmission 16 is mechanically inhibited by a mechanical parking mechanism. The operating position "R" is a reverse drive position for establishing the reverse speed "Rev" in the automatic transmission 16. The operating position "N" is a neutral position for establishing a neutral condition in which power transmission in the automatic transmission 16 is interrupted. The operating position "D" is a forward drive position selecting an automatic shift mode in which automatic shift control for switching the speed or gear ratio of the automatic transmission 16 to a selected one of the first speed "1st" to the sixth speed "6th" is performed based on running conditions of the vehicle according to a predetermined relationship. The operating position "S" is a forward drive position selecting a manual shift mode in which manual shift control is performed under which the speed or gear ratio of the automatic transmission 12 is switched to the consecutive higher speed or lower speed each time the shift lever 64 is operated to the operating position "+" or "−", respectively. The shift lever 64 corresponds to the manually operated member according to the invention. Thus, the automatic transmission 16 of this embodiment is provided with the manual shift mode in which shifting is executed based on the shift operation of the shift lever 64 to the operating position "+" or "−".

When the automatic shift mode is selected, the electronic control unit 50 performs automatic shift control of the automatic transmission 16 based on running conditions (operating conditions) of the vehicle, according to a pre-stored relationship. For example, the electronic control unit 50 determines the speed or gear ratio to be established, based on the throttle opening $\theta_{TH}$ or accelerator pedal stroke $\theta_{ACC}$, and the vehicle speed V, from a predetermined automatic shift map, and controls the operating states (engagement or release) of the clutches and brakes provided in the automatic transmission 16 so as to achieve the speed thus determined. When the manual shift mode is selected, the electronic control unit 50 performs manual shift control of the automatic transmission 16, based on a shift operation on the shift lever 64. For example, the electronic control unit 50 determines the speed or gear ratio to be established, based on the actual speed or gear ratio of the automatic transmission 16 and the operation of the shift lever 64 to the operating position "+" or "−", and controls the operating states (engagement or release) of the clutches and brakes provided in the automatic transmission 16 so as to achieve the speed thus determined.

The electronic control unit 50 also performs engagement control of the lock-up clutch 26 based on running conditions (operating conditions) of the vehicle, according to a pre-stored relationship. For example, the electronic control unit 50 stores, in advance, a lock-up clutch engagement map in which a torque conversion region where the lock-up clutch 26 is released, a lock-up slip region where the lock-up clutch 26 is partially engaged, and a lock-up region where the lock-up clutch 26 is engaged (fully engaged) are respectively defined, based on the throttle opening $\theta_{TH}$ or accelerator pedal stroke $\theta_{ACC}$, and the vehicle speed V. The electronic control unit 50 determines which of release control for releasing the lock-up clutch 26, lock-up slip control for partially engaging the lock-up clutch 26, and lock-up control for fully engaging the lock-up clutch 26 is to be executed, based on the throttle opening $\theta_{TH}$ or accelerator pedal stroke $\theta_{ACC}$, and the vehicle speed V, from the above-indicated lock-up clutch engagement map, and drives the linear solenoid valve SLU for lock-up control of the hydraulic control circuit 28 so as to perform the control thus determined.

Figure 4:
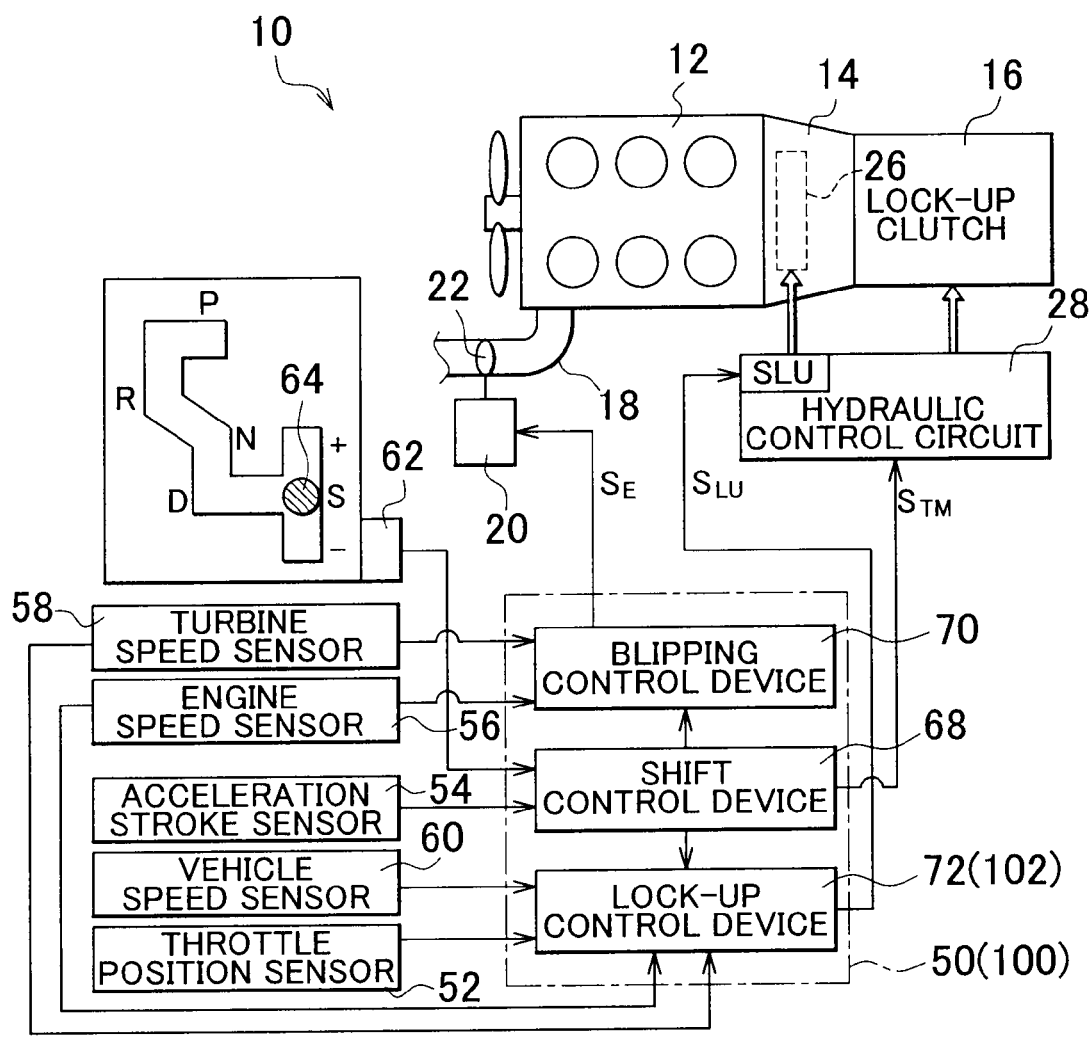
FIG. 4 is a functional block diagram useful for explaining principal control functions provided in an electronic control unit of FIG. 1.

FIG. 4 is a functional block diagram useful for explaining principal control functions provided in the electronic control unit 50. A shift control device 68 shown in FIG. 4 determines whether a shift operation representing a request for a power-off downshift has been conducted. For example, the shift control device 68 determines that a shift operation requesting a power-off downshift has been conducted, when the manual shift mode is selected as a result of the operation of the shift lever 64 to the shift position "S", and a shift operation to operate the shift lever 64 to the operating position "−" is detected, during running of the vehicle in a power-off mode in which the accelerator pedal stroke $\theta_{ACC}$ is smaller than a given accelerator pedal stroke $\theta_{ACC}1$ obtained by experiment and stored in advance.

When it is determined that the shift operation requesting the power-off downshift has been conducted, the shift control device 68 determines the speed or gear ratio to be established, based on the actual speed or gear ratio of the automatic transmission 16, and controls the operating states (engagement or release) of the clutches and brakes included in the automatic transmission 16 so as to establish the speed thus determined.

Also, the shift control device 68 determines whether the automatic transmission 16 is placed in a neutral condition during the power-off downshift, based on the operating conditions of the solenoid valves of the hydraulic control circuit 28 for controlling supply of hydraulic pressures to the hydraulic actuators of the clutches and brakes.

When the shift control device 68 determines that a shift operation requesting a power-off downshift is performed, a blipping control device 70 determines whether a request for blipping, i.e., a request to temporarily increase the engine speed $N_E$, is made, based on a difference between the output rotational speed and input rotational speed of the torque converter 14, namely, an input-output rotational speed difference $\Delta N$ as an absolute value of a difference between the turbine speed $N_T$ and the engine speed $N_E$, from a relationship obtained in advance by experiment. More specifically, the blipping control device 70 determines that a request for blipping is made, for example, when the input-output rotational speed difference $\Delta N$ is equal to or larger than a predetermined input-output rotational speed difference $\Delta N1$.

If it is determined that a request for blipping is made, the blipping control device 70 performs blipping control for temporarily increasing the engine speed $N_E$ by means of the electronic throttle valve 22, during the power-off downshift performed by the shift control device 68. More specifically, the blipping control device 70 increases the throttle opening $\theta_{TH}$ by a given throttle opening $\theta_{TH}1$, for a given period of time T1 measured from the time when the shift control device 68 determines that the automatic transmission 16 is placed in a neutral condition during power-off downshifting. The given throttle opening $\theta_{TH}1$ and the given period of time T1, which were obtained by experiment and stored in advance, are determined so that the input-output rotational speed difference $\Delta N$ is reduced to be smaller than a predetermined value A during the power-off downshift, for example. The predetermined value A was obtained by experiment in advance, as a value that would not cause such problems that 1) it is difficult to raise the engine speed $N_E$ due to an insufficient torque capacity of the lock-up clutch 26, even if lock-up control or lock-up slip control is executed, 2) large shock occurs due to the rise or increase of the engine speed $N_E$, and 3) the amount of heat generated in the lock-up clutch 26 exceeds an allowable value.

A lock-up control device 72 determines which control of release control of the lock-up clutch 26, lock-up slip control and lock-up control is to be executed under the current running conditions of the vehicle, based on the throttle opening $\theta_{TH}$ or accelerator pedal stroke $\theta_{ACC}$, and the vehicle speed V, from the lock-up clutch engagement map stored in advance.

When it is determined that the lock-up slip control or lock-up control is to be executed under the current running conditions of the vehicle, the lock-up control device 72 engages or partially engages the lock-up clutch 26, based on a difference between the output rotational speed and input rotational speed of the torque converter 14, or the input-output rotational speed difference $\Delta N$, which is reduced after the blipping control device 70 starts blipping control. More specifically, the lock-up control device 72 determines whether the input-output rotational speed difference $\Delta N$ is smaller than a predetermined value A when a given time T1 elapses from the time when the shift control device 68 determines that the automatic transmission 16 is placed in a neutral condition during a power-off downshift, and starts lock-up control or lock-up slip control when an affirmative decision is made (i.e., when it is determined that the difference $\Delta N$ is smaller than the predetermined value A). In this embodiment, the engine speed $N_E$ is raised or increased during the power-off downshift under blipping control so that the input-output rotational speed difference $\Delta N$ becomes smaller than the predetermined value A; therefore, the lock-up control device 72 starts lock-up control or lock-up slip control during the power-off downshift.

Figure 5:
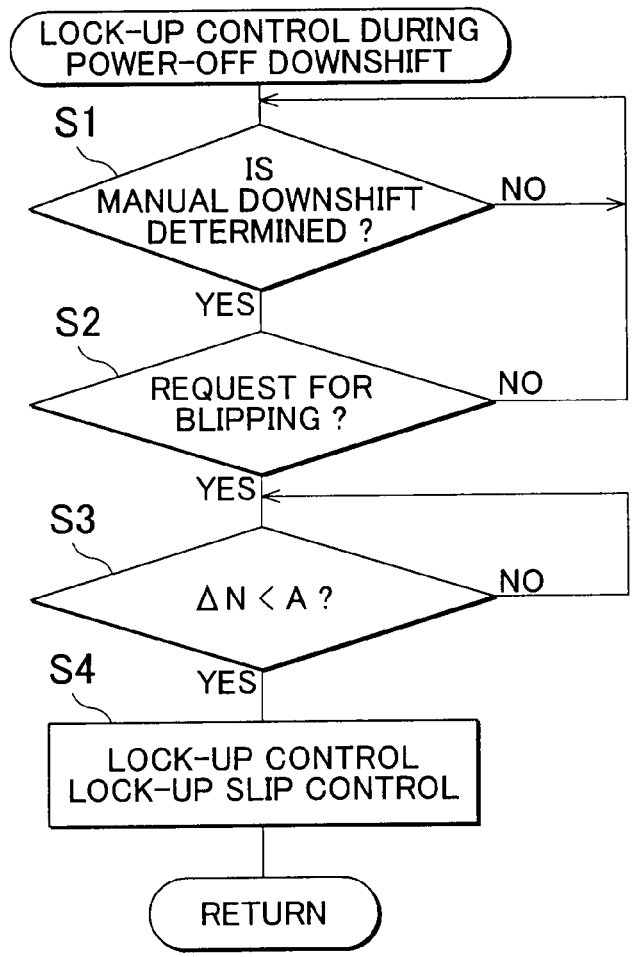
FIG. 5 is a flowchart illustrating principal control operations implemented through signal processing of the electronic control unit of FIG. 4, which flowchart is useful for explaining control operations associated with lock-up control or lock-up slip control performed during a power-off downshift.
Figure 6:
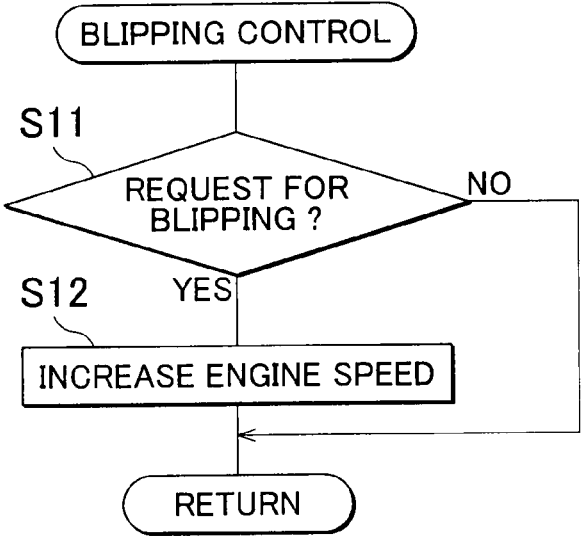
FIG. 6 is a flowchart illustrating principal control operations implemented through signal processing of the electronic control unit of FIG. 4, which flowchart is useful for explaining control operations associated with blipping control performed during a power-off downshift.

FIG. 5 and FIG. 6 are flowcharts explaining principal control operations implemented by signal processing of the electronic control unit 50. The flowchart of FIG. 5 is useful for explaining control operations associated with lock-up control or lock-up slip control performed during a power-off downshift, and a control routine according to the flowchart of FIG. 5 is repeatedly executed at extremely short time intervals or cycle time of, for example, about several milliseconds to several dozens of milliseconds.

In FIG. 5, it is determined in step S1 corresponding to the shift control device 68 whether a manual downshift operation for effectuating a power-off downshift has been performed. For example, it is determined that a shift operation requesting a power-off downshift, or a power-off downshift operation, has been performed, when the manual shift mode is selected with the shift lever 64 placed in the operating position "S" and a shift operation to operate the shift lever 64 to the operating position "−" is detected, during power-off running in which the accelerator pedal stroke $\theta_{ACC}$ is smaller than a given accelerator pedal stroke $\theta_{ACC}1$ obtained by experiment and stored in advance.

If a negative decision is made in step S1, step S1 is executed again; thus, step S1 and subsequent steps are repeatedly executed. If an affirmative decision is made in step S1, it is determined in step S2 corresponding to the blipping control device 70 whether a request for blipping, i.e., a request to temporarily increase the engine speed $N_E$, is made, based on the input-output rotational speed difference $\Delta N$, from a relationship obtained in advance by experiment.

If a negative decision is made in step S2, the control returns to step S1, and step S1 and subsequent step(s) are repeatedly executed. If an affirmative decision is made in step S2, it is determined in step S3 corresponding to the lock-up control device 72 whether the input-output rotational speed difference $\Delta N$ is smaller than a predetermined value A, based on the input-output rotational speed difference $\Delta N$ that is reduced after the blipping control device 70 starts blipping control, when a given length of time T1 elapses from the time when it is determined that the automatic transmission 16 is placed in a neutral condition.

If a negative decision is made in step S3, step S3 is executed again. If an affirmative decision is made in step S3, it is determined in step S4 corresponding to the lock-up control device 72 which control of release control of the lock-up clutch 26, lock-up slip control and lock-up control is to be executed under the current running conditions of the vehicle, based on the throttle opening $\theta_{TH}$ or accelerator pedal stroke $\theta_{ACC}$, and the vehicle speed V, from the lock-up clutch engagement map stored in advance. If it is determined in step S4 that the lock-up slip control or lock-up control is to be executed under the current running conditions, the lock-up clutch 26 is partially engaged or engaged. Then, the routine of FIG. 5 ends.

The flowchart of FIG. 6 is useful for explaining control operations associated with blipping control performed during a power-off downshift. A control routine according to the flowchart of FIG. 6 is repeatedly executed at extremely short time intervals or cycle time of, for example, about several milliseconds to several dozens of milliseconds, when it is determined that the vehicle is running in a power-off mode, the manual shift mode is selected with the shift lever 64 placed in the operating position "S", and a shift operation to operate the shift lever 64 to the operating position "–" is detected, namely, when it is determined that a shift operation requesting a power-off downshift has been performed.

In FIG. 6, it is determined in step S11 corresponding to the blipping control device 70 whether a request for blipping, i.e., a request to temporarily increase the engine speed $N_E$, is made, based on the input-output rotational speed difference $\Delta N$, from a relationship obtained in advance by experiment. For example, it is determined that a request for blipping is made when the input-output rotational speed difference $\Delta N$ is equal to or larger than a given input-output rotational speed difference $\Delta N1$.

If a negative decision is made in step S11, the routine of FIG. 6 is finished. If an affirmative decision is made in step S11, blipping control for temporarily increasing the engine speed $N_E$ by means of the electronic throttle valve 22 is performed in step S12 corresponding to the blipping control device 70. More specifically, the throttle opening $\theta_{TH}$ is increased by a given throttle opening $\theta_{TH}1$, for a given period of time T1 starting from the time when it is determined that the automatic transmission 16 is placed in a neutral condition during a power-off downshift. The given throttle opening 1 and the given period of time T1 are set to appropriate values obtained by experiment and stored in advance, so that the input-output rotational speed difference $\Delta N$ is reduced to be smaller than the predetermined value A during the power-off downshift.

Figure 7:
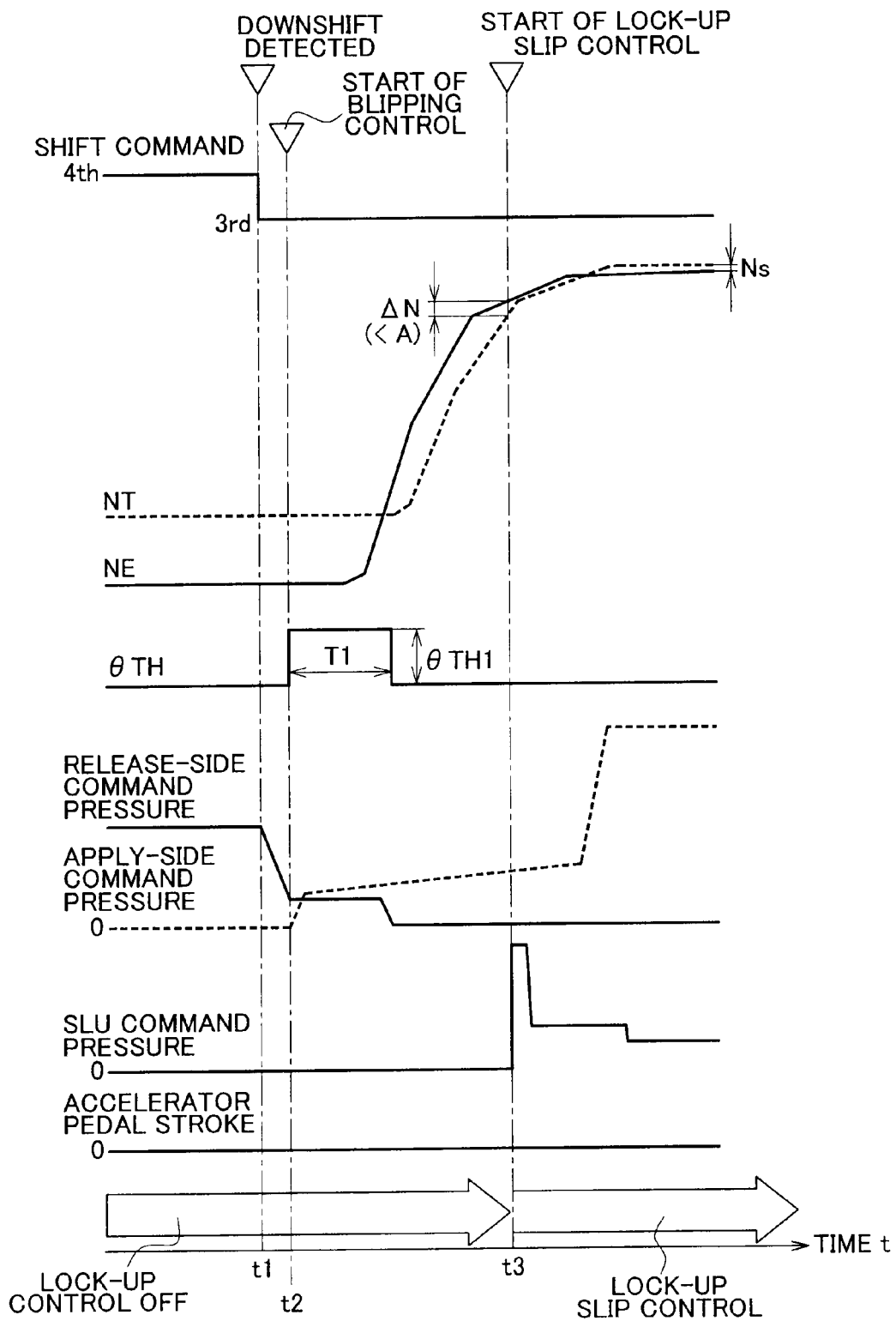
FIG. 7 is a time chart useful for explaining one example of control operations of the electronic control unit as shown in FIG. 5 and FIG. 6, for example, a time chart for the case where the vehicle is in running conditions under which lock-up slip control is executed.

FIG. 7 is a time chart useful for explaining one example of control operations of the electronic control unit 50 as shown in FIG. 5 and FIG. 6. For example, the time chart of FIG. 7 is concerned with the case where the vehicle is in running conditions under which lock-up slip control is executed. In FIG. 7, there are indicated, as seen from the top of the chart, a shift command indicative of the speed or gear ratio selected by means of the shift lever 64, turbine speed $N_T$ and engine speed $N_E$, throttle opening $\theta_{TH}$, command pressures to an off-going friction device (to be released) and an in-coming friction device (to be engaged) involved in shifting and selected from the above-mentioned clutches and brakes, command pressure to the linear solenoid valve SLU for lock-up control, and the accelerator pedal stroke $\theta_{ACC}$, all of which vary with time t. The vehicle conditions prior to time t1 in FIG. 7 are such that the vehicle is in a power-off running condition in which the accelerator pedal stroke $\theta_{ACC}$ is equal to zero, and the fourth speed or gear ratio is established in the automatic transmission 16, while the manual shift mode is selected with the shift lever 64 placed in the operating position "S". Namely, the vehicle is in operating conditions in which conditions for execution of the flowchart of FIG. 5 are satisfied.

In FIG. 7, time t1 is a point in time at which a shift operation to operate the shift lever 64 to the operating position "–" is detected. At time t1, an affirmative decision is made in step S1 of FIG. 5, and the conditions for execution of the flowchart of FIG. 6 are satisfied. Then, affirmative decisions are made in step S2 of FIG. 5 and step S11 of FIG. 6 immediately after the point in time t1. As shown in FIG. 7, the command pressure applied to the off-going friction device is reduced immediately after the point in time t1 so as to change the speed.

At time t2, it is determined that the command pressure applied to the off-going friction device becomes equal to or lower than a given value, and that the automatic transmission 16 is brought into a neutral condition, and blipping control is started. At this point in time t2, a control operation to increase the engine speed $N_E$ is carried out in step S12 of FIG. 6. The throttle opening $\theta_{TH}$ is increased by the given throttle opening $\theta_{TH}1$, for the given period of time T1 measured immediately after the above-indicated time point t2. The command pressure applied to the in-coming friction device is increased immediately after the above-indicated time point t2, to such an extent that the in-coming friction device is not engaged. Then, the engine speed $N_E$ starts increasing after a lapse of a certain time from time t2, due to the increase of the throttle opening $\theta_{TH}$. Then, the turbine speed $N_T$ starts increasing when the command pressure of the off-going friction device is made equal to zero, and the command pressure of the in-coming friction device is increased to such an extent that the in-coming friction device is partially engaged.

At time t3, it is determined that the input-output rotational speed difference $\Delta N$ as the absolute value of the difference between the engine speed N and the turbine speed $N_T$ is smaller than the predetermined value A, and lock-up slip control is started. At this point in time t3, a control operation to partially engage the lock-up clutch 26 is carried out in step S4 of FIG. 5. The command pressure applied to the linear solenoid valve SLU for lock-up control is controlled so that the turbine shaft 24 is rotated following rotation of the crankshaft of the engine 12, with the target slip amount $N_S$ set to, for example, about 50 to 100 rpm. In this embodiment, the command pressure of the linear solenoid valve SLU for lock-up control is set to a relatively high level for a given period of time immediately after the start of the lock-up slip control, so that the apply-side oil chamber 32 of the lock-up clutch 26 is rapidly filled with the hydraulic oil. The engine speed $N_E$ changes so that the difference between the engine speed $N_E$ and the turbine speed $N_T$ becomes equal to the above-indicated target slip amount $N_S$. In FIG. 7, the arrow labeled with "LOCK-UP CONTROL OFF" indicates that control for engaging or partially engaging the lock-up clutch 26 is stopped until the point in time t3, and the arrow labeled with "LOCK-UP SLIP CONTROL" indicates that control for partially engaging the lock-up clutch 26 is carried out from the point in time t3.

In this connection, FIG. 10, which corresponds to FIG. 7 showing the case of this embodiment, is a time chart useful for explaining control operations performed by an electronic control unit of the related art which does not include the blipping control device 70 and the lock-up control device 72. In the related art, as shown in FIG. 10, even where a power-off downshift is performed after time t21 at which a 4th to 3rd-speed downshift command is detected, in a condition where the engine speed $N_E$ is lower than the turbine speed $N_T$, lock-up control or lock-up slip control cannot be performed since the situation where there is a large difference between the engine speed $N_E$ and the turbine speed $N_T$ does not change even after the downshift. Thus, a sufficient deceleration cannot be achieved. In this case, lock-up control or lock-up slip control cannot be executed unless the engine speed $N_E$ is increased with the accelerator pedal depressed as indicated at time t22 of FIG. 10 after completion of the downshift, and the difference between the turbine speed $N_T$ and the engine speed $N_E$ becomes equal to or smaller than a given rotational speed difference that permits lock-up control or lock-up slip control to be stably performed.

The electronic control unit 50 as the control device of the vehicle drive-train system 10 of this embodiment includes the blipping control device 70 that temporarily increases the engine speed $N_E$ by means of the electronic throttle valve 22 during a power-off downshift when the automatic transmission 16 is in the manual shift mode, and the lock-up control device 72 that engages or partially engages the lock-up clutch 26, based on the input-output rotational speed difference $\Delta N$ (difference between the output rotational speed and input rotational speed of the torque converter) that is reduced after the start of the blipping control. Thus, when a downshift is requested during coasting (power-off running) while the engine speed $N_E$ is lower than the turbine speed $N_T$ with no lock-up control being conducted, the difference between the turbine speed $N_T$ and the engine speed $N_E$ is reduced to be smaller than the predetermined value A that permits lock-up control or lock-up slip control to be stably performed, so that each of the lock-up control and lock-up slip control can be stably performed. As a result, the engine is brought into a driven state, and a sufficient engine brake is applied, whereby a desired deceleration of the vehicle can be quickly achieved in response to a downshift during coasting (power-off running). For example, an engine brake is more quickly applied, as compared with the case where lock-up control or lock-up slip control is performed with the amount of operation of the accelerator pedal being equal to or close to zero, after the accelerator pedal is depressed after completion of the downshift and the engine speed $N_E$ is sufficiently increased, as shown in FIG. 10, for example.

According to the electronic control unit 50 of this embodiment, the lock-up control device 72 engages or partially engages the lock-up clutch 26, when the input-output rotational speed difference $\Delta N$ (difference between the output rotational speed and input rotational speed of the torque converter) is smaller than the predetermined value A that permits the lock-up control or lock-up slip control to be stably performed. Thus, the lock-up control or lock-up slip control can be stably performed when the input-output rotational speed difference $\Delta N$ is reduced to be smaller than the predetermined value A. On the other hand, if the lock-up control or lock-up slip control is performed when the input-output rotational speed difference $\Delta N$ is large, there arise such problems that 1) it is difficult to raise the engine speed $N_E$ due to an insufficient torque capacity of the lock-up clutch 26, 2) large shock occurs due to the rise or increase of the engine speed $N_E$, and 3) the amount of heat generated in the lock-up clutch 26 exceeds an allowable value, for example.

According to the electronic control unit 50 of this embodiment, the lock-up control device 72 engages or partially engages the lock-up clutch 26 during a power-off downshift, so that a desired deceleration of the vehicle can be more quickly achieved, as compared with the case where the lock-up clutch 26 is engaged or partially engaged after completion of a downshift. Also, there is another advantage that shock that occurs upon engagement of the lock-up clutch 26 is absorbed by shift shock.

Second Embodiment

Next, another embodiment (or second embodiment) of the invention will be described. In the following description of the second embodiment, the same reference numerals as used in the first embodiment will be assigned to elements or portions common to the first and second embodiments, and description of these elements or portions will not be provided.

As shown in FIG. 4, an electronic control unit 100 of the second embodiment of the invention includes a lock-up control device 102, in addition to the shift control device 68 and the blipping control device 70 included in the electronic control unit 50 of the above-described first embodiment. The lock-up control device 102 is different from the lock-up control device 72 included in the electronic control unit 50 in the following points. Namely, the lock-up control device 102 performs standby control for filling the apply-side oil chamber 32 of the hydraulic actuator of the lock-up clutch 26 with hydraulic oil of a predetermined standby pressure $P_{LC1}$ that does not cause the lock-up clutch 26 to be engaged, from the time when a power-off downshift is started by the shift control device 68. The filling of the apply-side oil chamber 32 with the hydraulic oil of the standby pressure $P_{LC1}$ is continued to a point in time immediately before lock-up control or lock-up slip control is executed.

Figure 8:
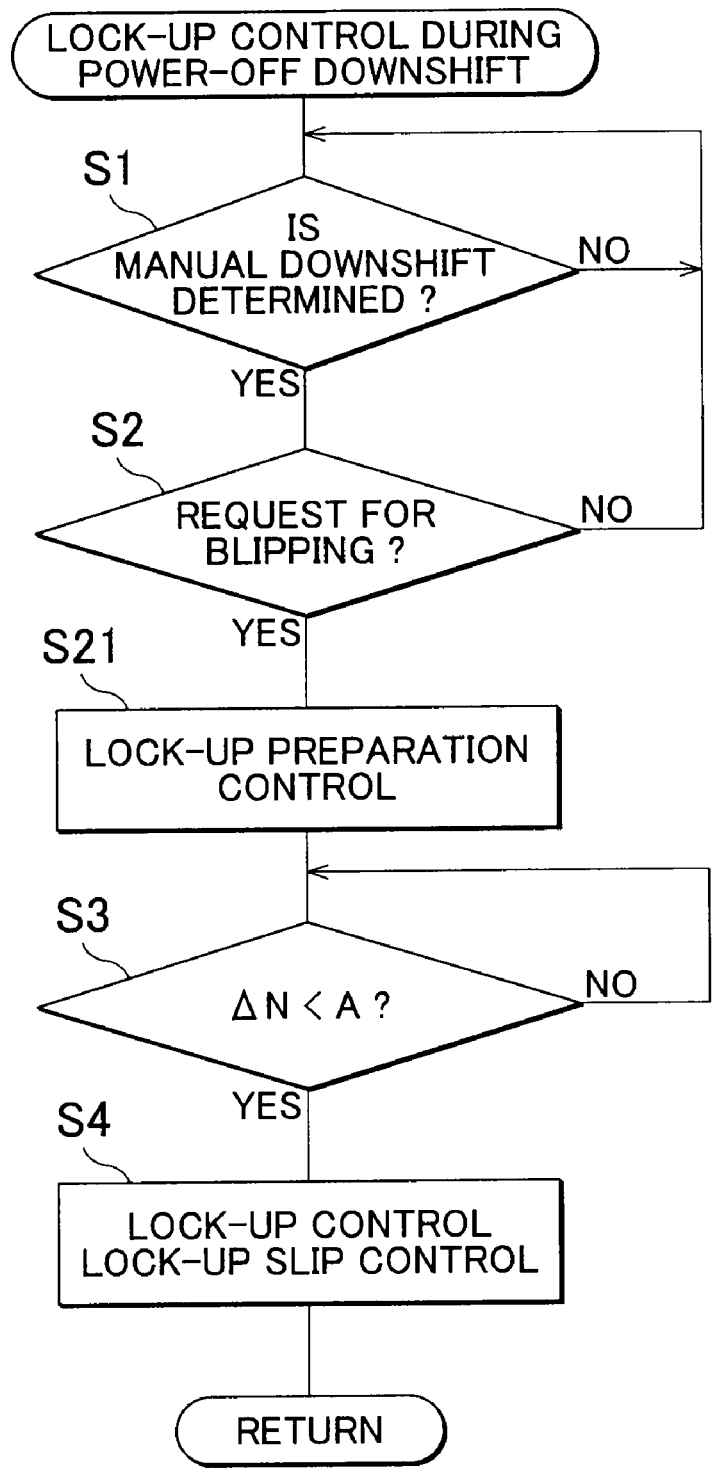
FIG. 8 is a flowchart illustrating principal control operations implemented through signal processing of an electronic control unit of another embodiment of the invention.

FIG. 8 and FIG. 6 are flowcharts explaining principal control operations implemented by signal processing of the electronic control unit 100. The flowchart of FIG. 6 is the same as that of the first embodiment, and therefore will not be explained. The flowchart of FIG. 8 is useful for explaining control operations associated with lock-up control or lock-up slip control performed during a power-off downshift, and a control routine according to the flowchart of FIG. 8 is repeatedly executed at extremely short time intervals or cycle time of about several milliseconds to several dozens of milliseconds, for example.

In FIG. 8, when an affirmative decision is made in step S2, the control proceeds to step S21 corresponding to the lock-up control device 102 in which the apply-side oil chamber 32 of the lock-up clutch 26 starts being filled with the hydraulic oil of the standby pressure $P_{LC1}$, from the time when the power-off downshift is started. After execution of step S21, steps S3 and subsequent step(s) are executed.

Figure 9:
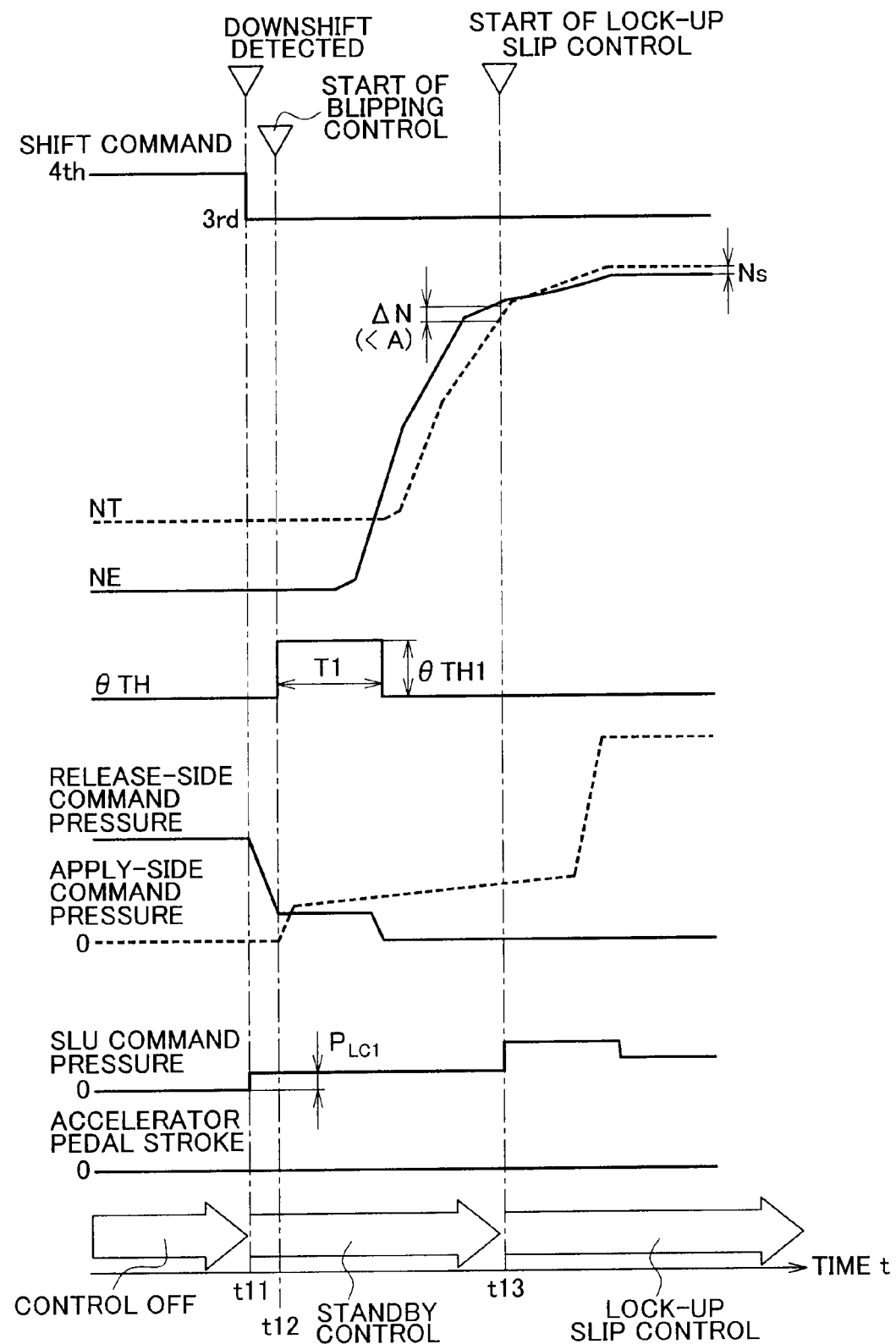
FIG. 9 is a time chart useful for explaining one example of control operations of the electronic control unit as shown in FIG. 8 and FIG. 6.

FIG. 9 is a time chart useful for explaining one example of control operations of the electronic control unit 100 as shown in FIG. 8 and FIG. 6. The time chart of FIG. 9 is concerned with the case where the vehicle is in the running conditions under which lock-up slip control is executed. FIG. 9 corresponds to FIG. 7 of the first embodiment. In the following, the engine speed $N_E$ and the command pressure applied to the linear solenoid valve SLU for lock-up control, which undergo different changes from those of FIG. 7, will be explained.

Referring to FIG. 9, the command pressure applied to the linear solenoid valve SLU for lock-up control is controlled to a given standby pressure $P_{LC1}$, immediately after a point in time t11 at which a manual downshift operation is detected and a downshift is started. As a result, the apply-side oil chamber 32 of the hydraulic actuator of the lock-up clutch 26 starts being filled with the hydraulic oil of the standby pressure $P_{LC1}$.

Immediately after a point in time t13 at which the lock-up slip control is started, the engine speed $N_E$ is controlled so as to follow the turbine speed $N_T$ with the above-indicated target slip amount $N_S$, at an earlier opportunity than that of the first embodiment in which no hydraulic pressure is applied to the apply-side oil chamber 32 before the lock-up slip control is started.

According to the electronic control unit 100 as the control device of the vehicle drive-train system 10 of this embodiment, the apply-side oil chamber 32 of the hydraulic actuator of the lock-up clutch 26 is filled with the hydraulic oil of the predetermined standby pressure $P_{LC1}$ that does not cause the lock-up clutch 26 to be engaged, during blipping control performed by the blipping control device 70, so that the lock-up clutch 26 can be engaged or partially engaged immediately after the start of the lock-up control or lock-up slip control, and thus a desired deceleration of the vehicle can be more quickly achieved.

While the embodiments of the invention have been described in detail with reference to the drawings, the invention is not limited to these embodiments, but may be otherwise embodied.

While the lock-up clutch 26 is partially engaged based on the input-output rotational speed difference ΔN that is reduced after blipping control is started by the blipping control device 70 in the examples shown in the time charts of FIG. 7 and FIG. 9, the invention is not limited to this arrangement, but the lock-up clutch 26 may be fully engaged.

While the speed or gear ratio of the automatic transmission 16 is changed each time the shift lever 64 is operated in the manual shift mode of the illustrated embodiments, the invention is not limited to this arrangement. For example, in the manual shift mode, the automatic transmission 16 may be arranged to be shifted up or down within a plurality of shift ranges of which the highest speed is limited, and one of the shift ranges may be switched to another shift range each time the shift lever 96 is operated in the manual shift mode.

It is to be understood that the illustrated embodiments are merely exemplary ones, and that the invention may be embodied with various changes or improvements, based on the knowledge of those skilled in the art, without departing from the principle of the invention.

What is claimed is:

1. A control device of a vehicle drive-train system including an engine, an electronic throttle valve operable to change an output rotational speed of the engine based on an electric command, without depending on an operation on an accelerator pedal, an automatic transmission having a manual shift mode in which shifting is effected based on a shift operation performed on a manually operated member, a torque converter provided between the automatic transmission and the engine, and a lock-up clutch operable to directly connect an input member and an output member of the torque converter with each other, comprising:
 a blipping control device that performs blipping control for temporarily increasing the output rotational speed of the engine by means of the electronic throttle valve, when a power-off downshift is performed while the automatic transmission is in the manual shift mode; and
 a lock-up control device that engages or partially engages the lock-up clutch, based on a difference between a rotational speed of the output member of the torque converter and a rotational speed of the input member thereof, which the difference is reduced after the blipping control is started.

2. The control device according to claim 1, wherein the lock-up control device engages or partially engages the lock-up clutch, when the difference between the rotational speed of the output member of the torque converter and the rotational speed of the input member thereof is smaller than a predetermined value.

3. The control device according to claim 1, wherein the lock-up control device fills a hydraulic actuator of the lock-up clutch with a hydraulic oil having a predetermined standby pressure that does not cause the lock-up clutch to be engaged, during blipping control of the blipping control device.

4. The control device according to claim 1, wherein the lock-up control device fills a hydraulic actuator of the lock-up clutch with a hydraulic oil having a predetermined standby pressure that does not cause the lock-up clutch to be engaged, when a shift operation requesting the power-off downshift is performed on the manually operated member.

5. The control device according to claim 1, wherein the lock-up control device engages or partially engages the lock-up clutch during the power-off downshift.

\* \* \* \* \*